May 31, 1966 J. COHN ETAL 3,254,279

COMPOSITE ALLOY ELECTRIC CONTACT ELEMENT

Filed April 17, 1963

INVENTORS
JAMES COHN
RICHARD COHN
BY
F. J. Sisarra
ATTORNEY

3,254,279
COMPOSITE ALLOY ELECTRIC CONTACT ELEMENT

James Cohn, 8 Roger Place, White Plains, N.Y., and Richard Cohn, 43 Harvard Road, Scarsdale, N.Y.

Filed Apr. 17, 1963, Ser. No. 273,743
12 Claims. (Cl. 317—236)

Figure 2:
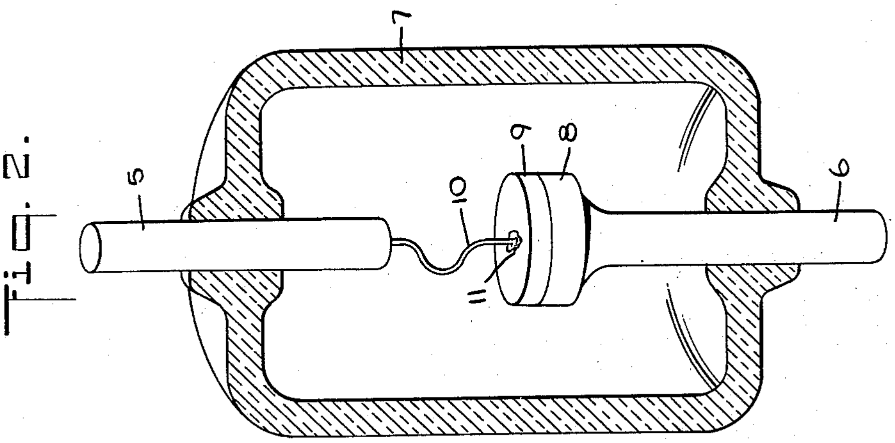

This application is a continuation-in-part of our pending application Serial No. 238,481, for "Contact Element for Semiconductor Devices," now abandoned.

This invention relates to the art of electrical devices and, more particularly, to an electrically conductive contact element which is adapted to be advantageously employed in various electrical devices.

There are a number of basic requirements for materials of electric contact elements, among the most important of which is low electrical resistance, i.e., high electrical conductivity. This invention pertains to electric contact elements having lower electrical resistance or resistivity than related known contact elements. Among such known contact elements are (1) those made of a binary alloy consisting of a major part gold and a minor part gallium, which are frequently employed in semiconductor devices, and (2) those made of a binary alloy consisting of a major part gold and/or silver and a minor part platinum or palladium, which are employed in various electrical devices.

Our said application Serial No. 238,481 is principally concerned with improved contact elements for semiconductor devices and is predicated on our discovery that the addition of prescribed amounts of platinum and/or palladium have the surprising and unexpected effect of substantially lowering the resistivity of a gallium-gold alloy in which the gallium content is within the range normally used in manufacturing contact elements for semiconductor devices.

We have also discovered that the addition of prescribed amounts of gallium have the surprising and unexpected effect of substantially lowering the resistivity of platinum-gold, platinum-silver and platinum-gold-silver alloys in which the platinum content is within the range generally employed in such alloys that are used in manufacturing contact elements. In these alloys, palladium may be substituted for all or part of the platinum.

In a semiconductor device in the category of transistors and diodes, an electrically conductive element is utilized to make contact between one electrode of the device and a semiconductor wafer of germanium or silicon, which is secured to another electrode of the device. This contact is commonly referred to in the art as a "whisker wire."

Heretofore such contact elements have frequently been made of a binary alloy consisting of gallium and gold which is usually employed in partly or fully annealed condition. One end of the gallium-gold contact element is anchored by welding to the first-mentioned electrode. The other end of the contact element is pointed and is placed in contact with the semiconductor wafer at the desired location. A suitable electric impulse is passed between the pointed end of the contact element and the wafer to form a permanent weld between these parts.

The gallium content of known gallium-gold contact elements of the character referred to above varies between approximately 0.5% and 3%, depending on specific applications and constructions. As is well known in the art, there is a definite relationship between the resistivity of a gallium-gold contact element and its gallium content. The resistivity of such elements increases as the gallium content is increased within the indicated percentage range, i.e., the higher the gallium content, the higher the resistivity of the contact element.

In certain applications, it is highly desirable to maintain the resistivity of the contact element as low as possible while employing a relatively high amount of gallium within the above-mentioned range. For example, there are instances where it is desirable to use contact elements having low resistivity for the dual purpose of facilitating the welding operations and minimizing the over-all resistance of the completed semiconductor device. This can not be attained with conventional gallium-gold alloy contact elements in view of the resistivity-gallium content relationship noted earlier herein.

We have discovered that the addition of platinum and/or palladium to an alloy of gallium and gold not only lowers the resistivity substantially but also increases the tensile strength of the alloy. This is very desirable from a manufacturing standpoint. Moreover, it has been ascertained that semiconductor devices utilizing such alloys for the material of their contact elements are more rugged than like devices having contact elements composed of conventional gallium-gold alloys.

Furthermore, we have found that the addition of platinum and/or palladium to the indicated gallium-gold alloys has the further unexpected effect of rendering such alloys more uniform in physical properties and electrical characteristics. This permits of closer control of completed devices employing gallium-containing contact elements.

It is the primary object of this invention to provide an improved alloy for use as an electric contact element.

Another object of this invention is to provide an alloy consisting essentially of gallium, at least one metal selected from the group consisting of platinum and palladium and at least one metal selected from the group consisting of gold and silver for use in making electric contact elements which possess more desirable electrical and physical characteristics than related present day contact elements.

A further object of the invention is to provide a contact element of the character indicated which is reasonable in material and manufacturing costs, which has greater uniformity in electrical and physical characteristics than comparable conventional contact elements and which is capable of performing its intended functions in an entirely satisfactory manner over an extended period of time.

The enumerated objects and additional objects, as well as the advantages of this invention, will be readily apparent to persons trained in the art from the following detailed description taken in conjunction with the accompanying drawing which describes and illustrates a semiconductor device having a contact element of this invention incorporated therein.

Figure 1:
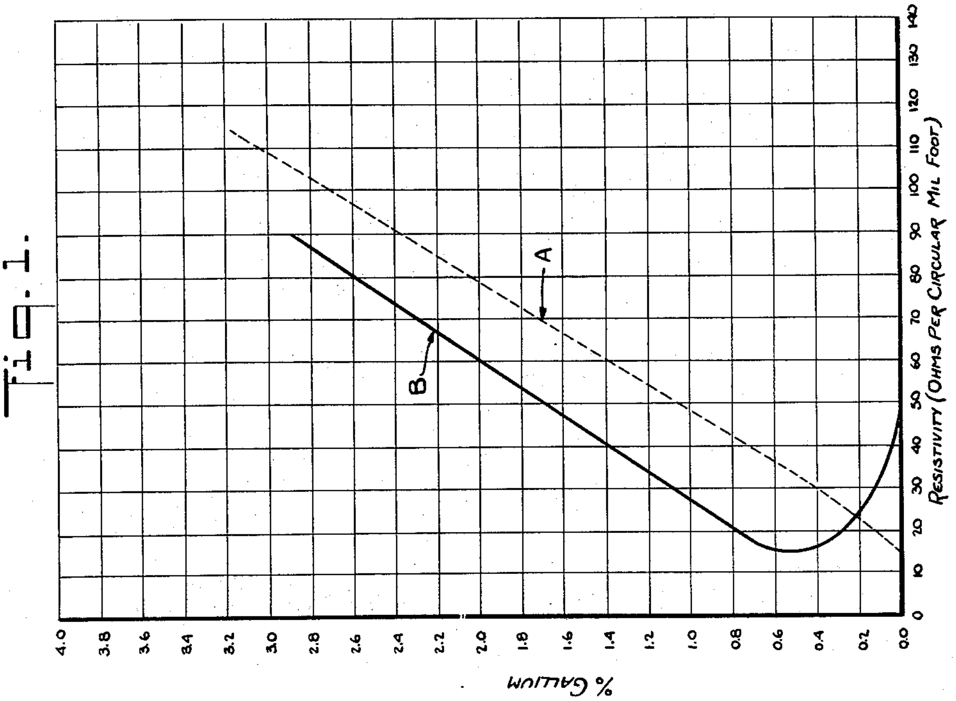

In the drawing:

FIG. 1 is a graph containing two curves which were obtained by plotting the percent gallium content of a first series of conventional alloys consisting of gallium and gold and the percent gallium content of a second series of alloys according to this invention and consisting of gallium, gold and platinum against the resistivity of each of such alloys; and FIG. 2 is a view in perspective and partly in central vertical cross-section of a semiconductor device constructed in accordance with this invention.

Referring initially to FIG. 1, we have shown therein a broken line curve which is identified by the letter A and a full line curve which is identified by the letter B. Curve A was obtained by plotting the percent gallium content of each of a series of conventional alloys consisting of gallium and gold against the resistivity of each of these alloys. Curve B was obtained by plotting the percent gallium content of each of a series of alloys consisting of gallium, gold and 2% platinum against the resistivity of each of these alloys. In each instance, the resistivity of the alloy was measured in ohms per circular mil foot and is so designated in FIG. 1.

It will be observed from the graph, by way of example, that an alloy consisting of 1.4% gallium, 2% platinum and the balance gold (Curve B) has a resistivity of approximately 40 ohms per circular mil foot while a binary alloy consisting of 1.4% gallium and the balance gold (Curve A) has a resistivity of approximately 61 ohms per circular mil foot. Thus, by substituting 2% platinum for a corresponding amount of gold, the resistivity of the alloy was reduced approximately 21 ohms per circular mil foot, or more than 34%.

Referring again to the graph, an alloy containing 2% platinum and having the same resistivity as the binary alloy in the foregoing example would have a gallium content of approximately 2.0%. It will hence be evident that, by adding 2% platinum, the gallium content may be substantially increased, i.e., from 1.4% to 2.0%, without increasing the resistivity.

It will be observed from the graph, by way of further example, that an alloy consisting of 2.3% gallium, 2% platinum and the balance gold (Curve B) has a resistivity of approximately 70 ohms per circular mil foot while a binary alloy consisting of 2.3% gallium and the balance gold (Curve A) has a resistivity of approximately 88 ohms per circular mil foot. Here, by substituting 2% platinum for a corresponding amount of gold, the resistivity of the resulting alloy was reduced approximately 18 ohms per circular mil foot, or more than 20%. While the percent reduction in resistivity in this example is not as great as that of the preceding example, it is nevertheless substantial. In fact, substantial reductions in resistivity occur in all of the alloys represented by Curve B starting with the one containing about 0.5% gallium, which, as stated earlier herein, is the preferred lower limit of the gallium content of contact elements for semiconductor devices.

For the best results, the amount of platinum employed in the alloy should be within the range of 1% to 4% by weight of the entire alloy. We have determined that gallium-gold alloys containing platinum in amounts less than 1% are somewhat less effective and that such alloys containing platinum in amounts greatly in excess of 4% come within the precipitation hardening range and are, for this reason, less suitable. Based on our determinations, it is recommended that the platinum content of the alloys of this invention be maintained within the range of 0.1% to 20% by weight of the entire alloy. It will be apparent that our discovery enables a manufacturer of semiconductor devices to select, within a substantial range, the resistivity best suited to his manufacturing techniques without altering the gallium content of the alloy.

We have also discovered that palladium may be substituted, wholly or in part, for the platinum component of the alloy with similar beneficial results. Such substitution should be on an atomic weight basis, which is equal to approximately 55% on a weight basis. Thus, the inclusion of 1.1% palladium for a like amount by weight of gold in the binary gallium-gold alloys discussed above would be equivalent to using 2% platinum for a corresponding amount of gold in such alloys.

Applying the conversion factor of 55% to ascertain the percentages of palladium which are equivalent to the stated percent ranges of platinum, it will be noted that the amounts of palladium in the alloy should be within the range of 0.55% to 2.2% by weight, for best results, and that in any case the palladium content of the alloy of this invention should be maintained within the range of 0.055% to 11%.

The following is an outline of the procedure employed in preparing a specific alloy and contact element according to this invention. The first portion of the procedure comprised preparing a "master alloy" consisting of 30% platinum and 70% gold. These metals were placed in a graphite crucible with a boric acid flux and melted in an induction furnace. In the course of melting, the metal components of the alloys were raised to a sufficiently high temperature to insure obtaining a homogeneous mixture thereof. The resulting alloy was then cut up for further use, as indicated below.

Quantities of gallium and gold were next weighed out together with the proper amount of the master alloy to obtain a final alloy consisting on a weight basis of 2% platinum, 1.7% gallium and 96.3% gold (hereinafter referred to as "Alloy I"). These components were placed in a graphite crucible, covered with boric acid flux, and melted in the induction furnace. The melt was poured into a vitreous mold to obtain an ingot of the alloy which was cooled slowly. The alloy, while still in ingot form, was then homogenized by heating it for two hours in a vacuum at a temperature of about 1400° F., after which it was rolled in steel rolls and drawn through diamond dies in accordance with standard industrial practice to form a contact element or whisker wire of this invention.

The contact element, after annealing, was found to have a resistivity of 52 ohms per circular mil foot. As will be noted from an examination of Curve A of FIG. 1, the corresponding gallium-gold alloy has a resistivity of approximately 69 ohms per circular mil foot. It is evident from the foregoing that the addition of 2% platinum lowered the resistivity of the alloy by 17 ohms per circular mil foot, or approximately 25%.

A second alloy, which is hereinafter referred to as "Alloy II," was prepared and tested. This alloy corresponded to Alloy I and utilized 1.1% palladium in place of the 2% platinum. The composition of Alloy II consisted of 1.1% palladium, 1.7% gallium and 97.2% gold. Alloy II was found to have a resistivity of 50.3 ohms per circular mil foot, or substantially the same resistivity as Alloy I.

It is our understanding that there is evidence of limited solid solubility of gallium in gold at ordinary ambient temperatures in binary alloys and that this has often resulted in non-uniform distribution of the gallium in such alloys (see Hansen's "Constitution of Binary Alloys," second edition, page 205). We have found that the addition of platinum and/or palladium reduces this inhomogeneity to a very marked extent, thereby assuring contact elements capable of making more uniform semiconductor devices and resulting in few rejections during manufacture. While we do not know the cause of this improvement in homogeneity, it is our theory that the addition of the platinum and/or palladium increases the solid solubility of gallium at ordinary room temperatures.

Reference is now had to FIG. 2 of the drawing which illustrates a semiconductor diode, including a contact element of this invention. The diode comprises a pair of aligned and spaced ohmic leads or electrodes, consisting of an upper electrode 5 and a lower electrode 6. The electrodes are made of suitable metal compositions, such as those which are commercially available under the trade names "Dumet" and "Kovar." Both electrodes extend into and are hermetically sealed to a glass envelope 7 in the usual manner. Electrode 6 is formed at its upper end with an integral stud or platform 8 to which a semiconductor member 9 is affixed in any suitable manner known to the art. The semiconductor member consists of a wafer of an appropriate semiconductor material, such as germanium or silicon.

An electrically conductive contact element 10 is interposed between the lower end of electrode 5 and the upper face of semiconductor member 9. The contact element is curved and constitutes a whisker wire and is made from a wire of one or more of the platinum-gallium-gold and palladium-gallium-gold alloy compositions described earlier herein. The upper end portion of contact element 10 is welded to the lower end of electrode 5. The lower end of the contact member is welded to semiconductor member 9, as indicated at 11.

The specific alloys and the ranges of ingredients of such alloys, mentioned above, are especially suitable as the materials for electric contact elements for semiconductor devices.

The ensuing parts of this description have reference to contact elements of this invention which are made from alloys that are related in composition to earlier-described alloys and which may be advantageously employed in various types of electrical devices.

The use of alloys consisting of a major part silver and/or gold and a minor part platinum and/or palladium, as the material of an electric contact element, is well known. We have discovered that the addition of small predetermined amounts of gallium to such alloys substantially lowers the resistance thereof.

For example, a palladium-silver alloy consisting of 3% palladium and 97% silver has a resistivity in the annealed state of 19.1 ohms per circular mil foot, while an alloy consisting of 3% palladium, 1% gallium and 96% silver in the annealed state has a resistivity of 14.4 ohms per circular mil foot. It will be noted that, by substituting 1% gallium for a like amount of silver, the resistivity of the alloy was lowered approximately 25%.

In another comparative example, in which platinum was used in place of palladium in the foregoing example, an alloy consisting of 3% platinum and 97% silver had a resistivity in an annealed state of 23.5 ohms per circular mil foot, while an alloy consisting of 3% platinum, 1% gallium and 96% silver in an annealed state had a resistivity of 16.0 ohms per circular mil foot. In this example, by substituting 1% gallium for a like amount of silver, the resistivity of the alloy was lowered approximately 37%.

We have found that the resistivity of the alloys depends on the percentage of gallium and/or platinum and/or palladium employed. This is demonstrated by the alloys and corresponding resistivities appearing in the following tables:

TABLE NO. I

| Alloy No. | Alloy Composition | Resistivity in Ohms per cir. mil ft. |
|---|---|---|
| 1 | 0% gallium, 3% platinum, 97% silver | 23.5 |
| 2 | 0.8% gallium, 3% platinum, 96.2% silver | 14.3 |
| 3 | 1.0% gallium, 3% platinum, 96% silver | 16.0 |
| 4 | 1.6% gallium, 3% platinum, 95.4% silver | 25.9 |

TABLE NO. II

| Alloy No. | Alloy Composition | Resistivity in Ohms per cir. mil ft. |
|---|---|---|
| 5 | 3% platinum, 0% gallium, 97% silver | 23.5 |
| 6 | 3% platinum, 1% gallium, 96% gold | 16.0 |
| 7 | 4% platinum, 1% gallium, 95% silver | 13.9 |
| 8 | 5% platinum, 1% gallium, 94% silver | 16.4 |

It will be observed from Table I that, in the therein listed alloys containing 3% platinum, the addition of 0.8% gallium (Alloy No. 2) has the maximum effect in lowering or depressing the resistivity, while the addition of 1.6% gallium (Alloy No. 4) raises the resistivity to a value higher than that of like alloys which are free of gallium (Alloy No. 1).

Referring to Table No. II, it will be noted that the resistivity of the listed alloys containing 1% gallium (Alloy Nos. 6, 7 and 8) are all subsantially lower than those without any gallium (Alloy No. 5). Further and more importantly, the resistivities of Alloy Nos. 6, 7 and 8 vary with the amount platinum employed. An increase in platinum content from 3% to 4% has the effect of further reducing the resistivity from 16.0 ohms per circular mil foot (Alloy No. 6) to 13.9 ohms per circular mil foot (Alloy No. 7). An increase in platinum content from 4% to 5% has the effect of raising the resistivity from 13.9 ohms per circular mil foot (Alloy No. 7) to 16.4 ohms per circular mil foot (Alloy No. 8). The resistivity of Alloy No. 8, while slightly higher than that of Alloy No. 6, is substantially lower than that of Alloy No. 5.

Certain of the foregoing examples are representative of low resistivity alloys containing silver or gold. As is indicated earlier herein, a mixture of silver and gold may be used in place of silver alone or gold alone with similar beneficial results. This is demonstrated by a comparison of the resistivities of two alloys, hereinafter identified as Alloy No. 9 and Alloy No. 10. Alloy No. 9, consisting of 6% platinum, 25% silver and 69% gold, had a resistivity of 93.3 ohms per circular mil foot. Alloy No. 10, consisting of 6% platinum, 25% silver, 68% gold and 1% gallium, had a resistivity of 77.7 ohms per circular mil foot. It will be noted that, by substituting 1% gallium for a like amount of gold in Alloy No. 9, the resistivity was reduced from 93.3 ohms per circular mil foot to 77.7 ohms per circular mil foot, or approximately 17%. It will be appreciated that while this reduction in resistivity is not as great as that in certain other instances mentioned above, it is nevertheless substantial.

The resistivities referred to herein are those for the indicated alloys in a fully annealed or partly annealed state. Such alloys have a temper suitable for immediate use or for further forming or heading, as would or might be employed in the electric contact art. It has been determined that additional cold working after annealing in excess of 75% does not appreciably raise the resistivity of the alloys.

An electric contact element of this invention, having suitable characteristics and properties, should be composed of an alloy consisting essentially of, on a weight basis, gallium in the amount of 0.3% to 6.0%, a metal selected from the group consisting of platinum in the amount of 0.1% to 20% and palladium in the amount of 0.055% to 11%, and the balance silver, gold or any desired mixture of silver and gold. Alternatively, the contact element may be a composite of two or more alloys composed of the ingredients in the amounts just described.

Preferably and for best results, it is recommended that the electric contact element be composed of an alloy consisting essentially of, on a weight basis, gallium in the amount of 0.3% to 3%, a metal selected from the group consisting of platinum in the amount of 1% to 4% and palladium in the amount of 0.55% to 3%, and the balance silver, gold or any desired mixture of silver and gold. Here again, the contact element may be a composite of two or more alloys composed of the ingredients in the amounts just described.

From the foregoing, it is believed that the objects, advantages and utility of our present invention will be readily comprehended by persons skilled in the art without further description. While a specific embodiment of the invention has been shown and described to illustrate the application of the invention principles, it will be understood that the invention may be embodied otherwise without departing from such principles.

We claim:

1. An electrically conductive contact element which is adapted to be used in an electrical device and which is composed of an alloy consisting essentially of gallium in the amount of 0.3% to 6%, a metal selected from the group consisting of platinum in the amount of 0.1% to 20% and palladium in the amount of 0.055% to 11%, said amounts being on a weight basis, the balance of the alloy being at least one metal selected from the group consisting of silver and gold.

2. An electrically conductive contact element which is adapted to be used in an electrical device and which is a composite of at least one platinum alloy and at least one palladium alloy according to claim 1.

3. An electrically conductive contact element which is adapted to be used in an electrical device and which is composed of an alloy consisting essentially of gallium in the amount of 0.3% to 3%, a metal selected from the group consisting of platinum in the amount of 1% to 4% and palladium in the amount of 0.55% to 3%, said amounts being on a weight basis, the balance of the alloy being at least one metal selected from the group consisting of silver and gold.

4. An electrically conductive contact element which is adapted to be used in an electrical device and which is a composite of at least one platinum alloy and at least one palladium alloy according to claim 3.

5. A contact element which is adapted to be used in a semiconductor device and which is composed of an alloy consisting essentially of gallium in the amount of 0.5% to 3%, a metal selected from the group consisting of platinum in the amount of 0.1% to 20% and palladium in the amount of 0.055% to 11%, said amounts being on a weight basis, the balance of the alloy being gold.

6. A contact element which is adapted to be used in a semiconductor device and which is a composite of at least one platinum alloy and at least one palladium alloy according to claim 5.

7. A contact element which is adapted to be used in a semiconductor device and which is composed of an alloy consisting essentially of gallium in the amount of 0.5% to 3%, a metal selected from the group consisting of platinum in the amount of 1% to 4% and palladium in the amount of 0.55% and 2.2%, said amounts being on a weight basis, the balance of the alloy being gold.

8. A contact element which is adapted to be used in a semiconductor device and which is a composite of at least one platinum alloy and at least one palladium alloy according to claim 7.

9. In a semiconductor device, an envelope, a plurality of electrodes extending into the envelope and comprising a first electrode and a second electrode, a member comprising a semiconductor material, the first electrode being connected to a first face of the member, a contact element within the envelope and composed of an alloy consisting essentially of gallium in the amount of 0.5% to 3%, a metal selected from the group consisting of platinum in the amount of 0.1% to 20% and palladium in the amount of 0.055% to 11%, said amounts being on a weight basis, the balance of the alloy being gold, one end portion of the contact element being secured to the second electrode, the other end portion of the contact element being secured to a second face of the member.

10. A semiconductor device as defined in claim 9 wherein the material of the contact element is a composite of at least one platinum alloy and at least one palladium alloy according to claim 13.

11. In a semiconductor device, an envelope, a plurality of electrodes extending into the envelope and comprising a first electrode and a second electrode, a member comprising a semiconductor material, the first electrode being connected to a first face of the member, a contact element within the envelope and composed of an alloy consisting essentially of gallium in the amount of 0.5% to 3%, a metal selected from the group consisting of platinum in the amount of 1% to 4% and palladium in the amount of 0.55% to 2.20%, said amounts being on a weight basis, the balance of the alloy being gold, one end portion of the contact element being secured to the second electrode, the other end portion of the contact element being secured to a second face of the member.

12. A semiconductor device as defined in claim 11 wherein the material of the contact element is a composite of at least one platinum alloy and at least one palladium alloy according to claim 11.

References Cited by the Examiner

UNITED STATES PATENTS

| | | | |
|---|---|---|---|
| 937,284 | 10/1909 | Craft et al. | 75—165 |
| 1,104,073 | 7/1914 | Pickard | 317—236 |
| 2,071,216 | 2/1937 | Powell et al. | 75—165 |
| 3,064,341 | 11/1962 | Masterson | 317—234 |
| 3,118,094 | 1/1964 | Cornelison | 317—235 |

JOHN W. HUCKERT, *Primary Examiner.*

A. M. LESNIAK, *Assistant Examiner.*